A. BOUGHTON.
TREE COLLAR.
APPLICATION FILED FEB. 18, 1914.

1,200,920.

Patented Oct. 10, 1916

Witnesses
CRBealle.
H. Kaye Meister

Inventor
A. Boughton.
By ........ Randolph Jr.
Attorney

UNITED STATES PATENT OFFICE.

ALLYN BOUGHTON, OF NEODESHA, KANSAS.

TREE-COLLAR.

1,200,920.
Specification of Letters Patent.
Patented Oct. 10, 1916.

Application filed February 18, 1914. Serial No. 819,522.

*To all whom it may concern:*

Be it known that I, ALLYN BOUGHTON, a citizen of the United States, residing at Neodesha, in the county of Wilson and State of Kansas, have invented certain new and useful Improvements in Tree-Collars; and I do hereby declare the following to be a full, clear, and exact description of the invention, such as will enable others skilled in the art to which it appertains to make and use the same.

This invention relates to new and useful improvements in tree guards, and has for its principal object to provide a device by means of which a tree will be protected from the ravages of insects and the like.

Another object of the invention is to provide a device which may be easily and quickly put in place which will accomplish the above results without in any way injuring the tree.

A further object of the invention is to provide a simple and effective guard which will be water-proof and thereby be prevented from being injured due to the action of the elements.

With these and other objects in view, the invention consists in the novel combination and arrangement of parts which will be fully set forth in the following specification and accompanying drawings, in which—

Figure 1:
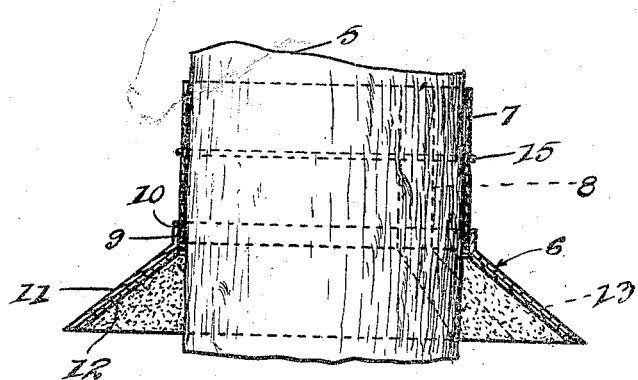
Figure 2:
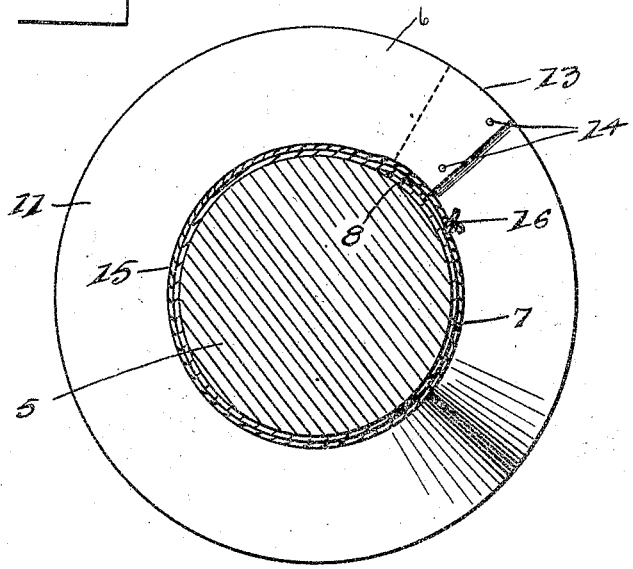

Figure 1 is a view of a fragment of a tree showing the guard applied thereto partly in section, and Fig. 2 is a sectional view through a tree showing the guard applied thereto.

Referring now to the drawings by characters of reference, the numeral 5 designates the trunk of the tree which is to be protected by the guard, designated generally by the numeral 6. The guard 6 is removably secured and is capable of being adjusted to the different sizes of trees at the will of the operator.

The guard 6 preferably comprises the band 7 which is of cloth or a similar flexible material, and the ends of said band are overlapped as at 8 to provide for adjustment of the device. Suitably secured to the lower end of the band as at 9, is provided the collar 10 which is formed integral with a sheltering element 11 to form a substantially funnel-shaped member. This funnel-shaped member is preferably of a water-proof material such as tar paper or a similar substance, and has secured to the inner side thereof, a strip of gummed paper 12, the under surface of which is provided with a sticky substance and is adapted to entangle the insects which alight thereon, and prevent the same from injuring the tree. The terminals of the element 11 are overlapped as at 13, and secured by rivets or other fastening means as at 14.

In fitting the device in place, it will be apparent that the band 7 is placed around the tree and a string or other flexible member 15 passed around the exterior of the band and tied as at 16 to hold the band in its proper place.

It will be apparent that when the device is placed on a tree and adjusted to the proper size thereof, the sticky surface of the under side of the element 11 will impede the progress of any insect which may come in contact therewith, and prevent said insect from injuring the tree in any way.

It is further apparent that the gummed paper 12 is effectually protected against rain and the like by the water-proof member 11 which is so arranged as to deflect outwardly and away from the paper 12 and prevent the entrance of moisture between the members 11 and 12. The cloth band 7 arranged above the member 11 absorbs the greater part of the water flowing downwardly upon the tree trunk during a rain and thus assists in keeping the gummed paper 12 in a dry condition.

While in the foregoing there has been shown and described the preferred embodiment of this invention, it is to be understood that such changes may be made in the combination and arrangement of parts as will fall within the spirit and scope of the invention as claimed.

Having thus described my invention, I claim:

A tree guard comprising a band formed of flexible material adapted to be removably and adjustably secured around the trunk of a tree, the vertical ends of the band overlapping one another to provide for the adjustment, a collar having an annular flange at its upper end, said flange secured to the lower end of the band, the vertical end of the flange and collar overlapped to provide for the adjustment for the same with relation to the band, said collar inclined downwardly and outwardly forming a substantially funnel-shaped member, the outer face of said collar being formed of water proof material, a strip of gummed paper secured to the under face of said funnel shaped member and provided with a sticky substance and flexible means secured around said band for holding the same secured around the trunk of the tree, said waterproof outer face and the collar preventing the sticky substance on the under side thereof from becoming washed out.

In testimony whereof I affix my signature in presence of two witnesses.

ALLYN BOUGHTON.

Witnesses:
F. C. WILLIAMS,
H. A. LOCKARD.